US009853669B2

(12) United States Patent
Croyle

(10) Patent No.: US 9,853,669 B2
(45) Date of Patent: Dec. 26, 2017

(54) MODULAR RADIO FREQUENCY HUB AND INTERCHANGEABLE MODULES

(71) Applicant: Rajant Corporation, Malvern, PA (US)

(72) Inventor: James Croyle, Malvern, PA (US)

(73) Assignee: Rajant Corporation, Malvern, PA (US)

( * ) Notice: Subject to any disclaimer, the term of this patent is extended or adjusted under 35 U.S.C. 154(b) by 12 days.

(21) Appl. No.: 13/939,091

(22) Filed: Jul. 10, 2013

(65) Prior Publication Data

US 2014/0080527 A1  Mar. 20, 2014

Related U.S. Application Data

(60) Provisional application No. 61/671,431, filed on Jul. 13, 2012.

(51) Int. Cl.
*H04B 1/00* (2006.01)
*H04B 15/00* (2006.01)
(Continued)

(52) U.S. Cl.
CPC ............. *H04B 1/38* (2013.01); *H04B 1/3827* (2013.01)

(58) Field of Classification Search
CPC ...... H04B 7/0413; H04B 7/0691; H04B 1/38; H04B 1/3818; H04B 1/3827; H04B 7/022; H04B 7/024; H04B 7/0689; H04L 43/0876; H04L 45/52; H04L 5/0023; H04L 5/0032; H04L 5/0064; H04L 5/0092; H04L 25/03159; H04W 16/04; H04W 16/06; H04W 16/10; H04W 16/12; H04W 16/14; H04W 16/18; H04W 24/02; H04W 28/08; H04W 28/16; H04W 36/0083; H04W 36/06; H04W 40/02; H04W 40/24;
(Continued)

(56) References Cited

U.S. PATENT DOCUMENTS

| 5,404,574 A * | 4/1995 | Benveniste .................... 455/447 |
| 6,072,238 A * | 6/2000 | Viswanathan et al. ........ 257/719 |
| 6,259,929 B1 * | 7/2001 | Kuisma ............... H04M 1/0254 455/575.1 |
| 6,876,841 B1 * | 4/2005 | Kosaka ......................... 455/300 |

(Continued)

*Primary Examiner* — Yuwen Pan
*Assistant Examiner* — Paul P Tran
(74) *Attorney, Agent, or Firm* — Blank Rome LLP; Michael C. Greenbaum; Jonathan R. King

(57) ABSTRACT

The present invention provides for a modular radio frequency communications assembly including a radio frequency hub and one or more radio frequency modules. Each radio frequency module includes a power and data interface for receiving power from and exchanging data with a modular radio frequency hub and a processor and memory for providing at least one of change a communications frequency, increase communications bandwidth, or add security using the one or more antennas and the power and data interface. The radio frequency hub includes two or more communications interfaces for connecting to two or more radio frequency modules, wherein each of the communications interfaces have the same physical and electrical configuration; A shared data and power interface for sharing data and power among the two or more radio frequency modules. A bus distributes data and power among the two or more radio frequency modules. One or more antenna interfaces are located on the RF hub or the RF modules for connecting radio frequency antennas.

12 Claims, 18 Drawing Sheets

(51) Int. Cl.
*H04W 40/00* (2009.01)
*H04B 7/00* (2006.01)
*H04W 4/00* (2009.01)
*G06F 15/173* (2006.01)
*H04B 1/38* (2015.01)
*H04B 1/3827* (2015.01)

(58) Field of Classification Search
CPC ... H04W 40/246; H04W 40/30; H04W 40/36; H04W 48/18; H04W 48/20; H04W 72/00; H04W 72/0453; H04W 76/04; H04W 84/18; H04W 88/06; H04W 88/085; H04W 88/10; H04W 8/005; H04W 52/225; H04W 52/287; H04W 52/241; H04W 52/244; H04W 84/12
USPC ....... 455/63.1, 63.3, 69, 437, 446, 447, 504, 455/515, 562.1; 370/248, 249, 254, 310, 370/311, 328, 329, 331, 336, 338, 395.31, 370/503; 709/223, 224
See application file for complete search history.

(56) References Cited

U.S. PATENT DOCUMENTS

| | | | |
|---|---|---|---|
| 7,532,640 B2 * | 5/2009 | Kelly | H04L 69/08 370/352 |
| 7,603,141 B2 * | 10/2009 | Dravida | 455/562.1 |
| 8,341,289 B2 | 12/2012 | Hellhake et al. | |
| 8,787,350 B2 * | 7/2014 | Joshi | H04L 45/00 370/229 |
| 8,971,210 B1 * | 3/2015 | Murali et al. | 370/254 |
| 2003/0190927 A1 * | 10/2003 | Leong | H04B 1/3816 455/525 |
| 2004/0203859 A1 * | 10/2004 | Yuen et al. | 455/456.1 |
| 2007/0038743 A1 | 2/2007 | Hellhake et al. | |
| 2008/0279138 A1 * | 11/2008 | Gonikberg et al. | 370/328 |
| 2009/0168734 A1 * | 7/2009 | Cho | H01Q 1/084 370/338 |
| 2010/0067585 A1 * | 3/2010 | Cai | H04B 1/38 375/256 |
| 2012/0250740 A1 * | 10/2012 | Ling | H04W 88/085 375/219 |
| 2013/0003658 A1 * | 1/2013 | Stewart | H04B 7/022 370/328 |

* cited by examiner

MODULAR RADIO FREQUENCY HUB AND INTERCHANGEABLE MODULES

This patent application is a non-provisional of 61/671,431, filed Jul. 13, 2012 the entire disclosure of which is incorporated herein by reference.

FIELD OF THE INVENTION

The present invention relates to radio frequency communication devices. More specifically, the present invention relates to a modular radio frequency hub for connecting one or more interchangeable radio frequency modules.

BACKGROUND OF THE INVENTION

Given that radio communications occur over a single given frequency, or narrow frequency range at a time, and given that a particular frequency range can be "crowded" with excessive transmissions, it can be necessary to add an additional radio frequency to alleviate RF congestion or to increase bandwidth. For example, 2.4 GHz is one of the most common frequencies of communication used in wireless laptop network access; some laptops have the option of switching to 5.8 GHz in order to avoid congested 2.4 GHz networks. In general, hardware is predefined by a manufacturer and, as a result, a particular device may have one or possibly two communication frequencies. Changing this frequency at a later date often requires qualified personnel to install new hardware which in turn removes the old hardware, such as substituting a 900 MHz radio for a 2.5 GHz radio.

Thus, there is a need for adding additional bandwidth/frequencies without complex hardware configuration and without loss of existing and useful hardware.

SUMMARY OF THE INVENTION

It is to be understood that both the following summary and the detailed description are exemplary and explanatory and are intended to provide further explanation of the invention as claimed. Neither the summary nor the description that follows is intended to define or limit the scope of the invention to the particular features mentioned in the summary or in the description.

The subject matter described herein includes a modular radio frequency (RF) hub. The RF hub includes two or more communications interfaces for connecting to two or more radio frequency modules, where each of the communications interfaces have the same physical and electrical configuration. A shared data and power interface of the RF hub shares data and power among the two or more RF modules. A bus distributes data and power among the two or more RF modules when connected to the two or more communications interfaces and the shared data and power interface.

The subject matter described herein further includes an RF module. It is appreciated that one or more of the RF modules may be used together with the RF hub described above. Each of the RF modules includes a power and data interface for receiving power from and exchanging data with a modular RF hub, and a processor and memory provide at least one of change a communications frequency, increase communications bandwidth, or add security using the one or more antennas and the power and data interface.

The present invention also provides for a modular radio frequency communications assembly that includes both a radio frequency hub and one or more radio frequency modules. Each radio frequency module includes a power and data interface for receiving power from and exchanging data with a modular radio frequency hub and a processor and memory for providing at least one of change a communications frequency, increase communications bandwidth, or add security using the one or more antennas and the power and data interface. The radio frequency hub includes two or more communications interfaces for connecting to two or more radio frequency modules, wherein each of the communications interfaces have the same physical and electrical configuration. A shared data and power interface for sharing data and power among the two or more radio frequency modules. A bus distributes data and power among the two or more radio frequency modules. One or more antenna interfaces are located on the RF hub or the RF modules and allow for connecting radio frequency antennas.

Other objects, advantages and salient features of the invention will become apparent from the following detailed description, which, taken in conjunction with the annexed drawings, discloses a preferred embodiment of the present invention.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying Figures.

DETAILED DESCRIPTION OF THE INVENTION

Figure 1A:
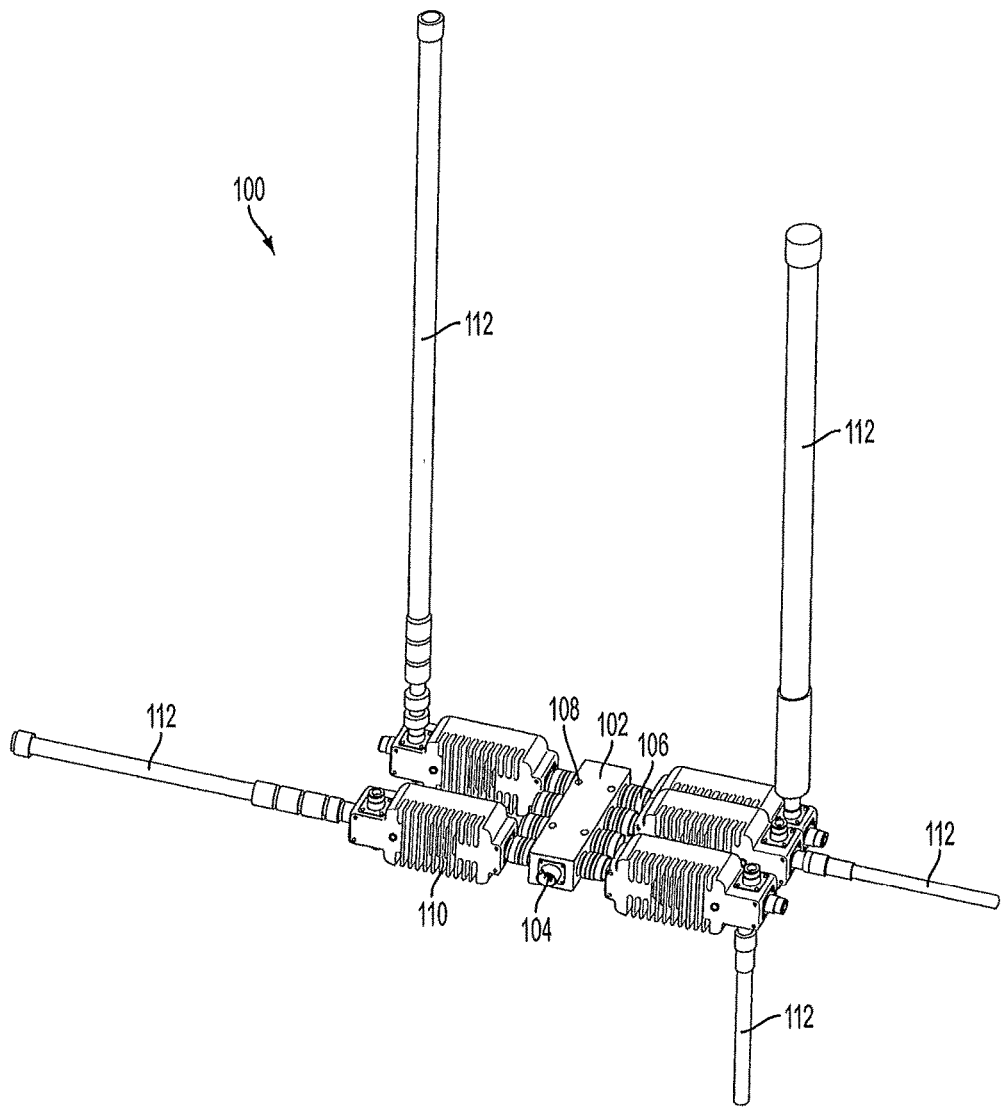
FIG. 1A is a diagram showing a perspective view of an exemplary modular RF communications assembly including antennas according to an embodiment of the subject matter described herein.

The present invention will be described in terms of one or more examples, with reference to the accompanying drawings. In the drawings, like reference numbers indicate identical or functionally similar elements. Additionally, the left-most digit(s) of most reference numbers may identify the drawing in which the reference numbers first appear.

The present invention will be explained in terms of exemplary embodiments. This specification discloses one or more embodiments that incorporate the features of this invention. The disclosure herein will provide examples of embodiments, including examples of data analysis from which those skilled in the art will appreciate various novel approaches and features developed by the inventors. These various novel approaches and features, as they may appear herein, may be used individually, or in combination with each other as desired.

In particular, the embodiment(s) described, and references in the specification to "one embodiment", "an embodiment", "an example embodiment", etc., indicate that the embodiment(s) described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, persons skilled in the art may effect such feature, structure, or characteristic in connection with other embodiments whether or not explicitly described.

Embodiments of the invention may be implemented in hardware, firmware, software, or any combination thereof, or may be implemented without automated computing equipment. Embodiments of the invention may also be implemented as instructions stored on a machine-readable medium, which may be read and executed by one or more processors. A machine-readable medium may include any mechanism for storing or transmitting information in a form readable by a machine (e.g. a computing device). For example, a machine-readable medium may include read only memory (ROM); random access memory (RAM); hardware memory in PDAs, mobile telephones, and other portable devices; magnetic disk storage media; optical storage media; flash memory devices; electrical, optical, acoustical, or other forms of propagated signals (e.g. carrier waves, infrared signals, digital signals, analog signals, etc.), and others. Further, firmware, software, routines, instructions, may be described herein as performing certain actions. However, it should be appreciated that such descriptions are merely for convenience and that such actions in fact result from computing devices, processors, controllers or other devices executing the firmware, software, routines, instructions, etc.

FIG. 1 is a diagram showing a perspective view of an exemplary modular RF communications assembly including an RF hub and a plurality of RF modules with associated antennas according to an embodiment of the subject matter described herein. Referring to FIG. 1, modular RF communications assembly 100 includes an RF hub 102 for sharing data and power when connecting together multiple RF modules 110 and associated RF antennas 112. The modular RF hub 102 allows transfer of data, through an existing data bus (ethernet, usb, serial, sata, pci, pci-e, etc) to an RF module 110 such as a transmitter or radio. Data transferred using the RF hub 102 may require some level of processing before distribution, and may be handled using a micro-computer or other processing means as described below. It is also appreciated that while an eight port/eight module configuration is shown, any number of two or more ports for supporting two or more RF modules may be used without departing from the scope of the subject matter described herein. The RF hub 102 also serves as a mechanical support for the RF modules 110 so that additional RF modules 110 added at any time with little mechanical effort.

The RF hub 102 includes a data switch and a power distribution scheme that includes a data and power interface 104. The data and power interface 104 may be connected to other networking equipment (not shown) which may provide power and a wired data connection, for example, to the internet. The power and data interface 104 may be shared by multiple modules in the RF hub 102 in order to minimize physical space and reduce redundancies.

The RF hub 102 also includes two or more modular communications interfaces 106 for connecting to the RF modules 110. The modular communications interfaces 106 may use either a standardized or a proprietary physical configuration as well as either standardized or proprietary communications protocols for interfacing with the RF modules 110. It is appreciated that because the RF modules 110 use the modular communications interface 106, the RF modules 110 may be easily added or removed from the RF hub 102. The RF hub 102 may further include one or more mounting holes 108 for physically securing the RF hub 102 to, for example, a wall or utility pole.

The RF modules 110 and their antennas 112 may utilize any possible frequency. For example, different antennas 112 may be associated with 2.4 GHz, 900 MHz, 1.4 GHz, 4.9 GHz, and 5.8 GHz. Additionally, the antennas 112 may be connected in a variety of user-configurable orientations. It is appreciated that while omni-directional antennas are shown in FIG. 1, any type of antenna 112 may be used (e.g., sector, parabolic, etc.) without departing from the scope of the subject matter described herein. It is further appreciated that RF hub 102 and/or RF modules 110 can include means for powering active antennas using power delivered over RF lines.

In another embodiment, the RF module 110 can include a specialized radio module which does not necessarily increase bandwidth but adds other functionality. For example, a security-oriented configuration of RF module 110 may provide a specialized level of encryption. This security-oriented RF module 110 may only communicate with others of its kind and, as such, an end user could quickly add an encrypted segment to their network to enable secure transactions or other features.

In another embodiment, the modular RF communications assembly 100 may be used together with additional modular RF communications assemblies 100 in order to provide a communications network, such as a mesh network. One example of a communications network suitable for use with the modular RF communications assembly 100 is described in U.S. patent application Ser. No. 11/435,287 filed on May 17, 2006 and entitled, "SYS IBM AND METHOD FOR COMMUNICATION IN A WIRELESS MOBILE AD-HOC NETWORK" (Attorney Docket Number 117922-00109), which is incorporated by reference herein in its entirety. According to U.S. patent application Ser. No. 11/435,287, the network preferably provides a mesh architecture with a protocol that transparently recovers from node failures, jamming, and traffic congestion. The network preferably does not rely on base stations, root nodes or any central routing control authority, and therefore does not require constant communication with any given network component for proper operation. In accordance with one example, the wireless network includes several wireless network node devices, such as the modular RF communications assembly 100, communicating wirelessly over a communication link. Each communication link utilized by the modular RF communications assembly 100 includes at least one channel that conforms to the IEEE 802.11b, 802.11a, 802.11g or other standard as a forward and backward link for communicating with other modular RF communications assemblies 100 in the network. Each modular RF communications assembly 100 includes at least one transceiver, a processor module, a memory module and control software logically connected to select and configure at least one transceiver for establishing and maintaining a communications link with other modular RF communications assemblies 100 on the network by scanning and selecting a channel from a pool of available channels.

Figure 1B:
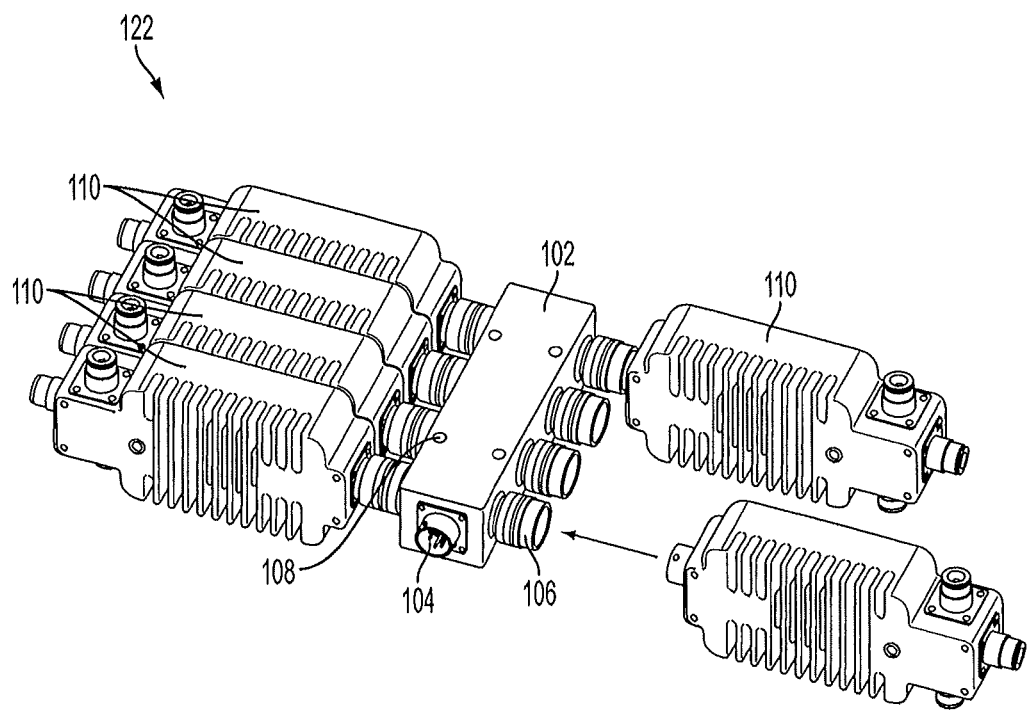
FIG. 1B is a diagram showing a perspective view of an exemplary modular RF hub and associated RF modules according to an embodiment of the subject matter described herein.

FIG. 1B is a diagram showing a perspective view of an exemplary modular RF communications assembly without antennas according to an embodiment of the subject matter described herein. Referring to FIG. 2, the RF hub 202 includes a data and power interface 204 shared by multiple RF modules 210. The RF hub 202 also includes two or more modular communications interfaces 206 for connecting to the RF modules 210. The modular communications interfaces 206 may use either a standardized or a proprietary physical configuration as well as either standardized or proprietary communications protocols for interfacing with the RF modules 210 so that the RF modules 210 may be easily added or removed from the RF hub 202. The RF hub 202 may further include one or more mounting holes 208. An end user need only add RF modules 210 to their network in order to change frequency, increase bandwidth, or add security. Inside of each of the RF modules 210, a bus may be used to gang together data and power which is described in greater detail below.

Figure 2A:
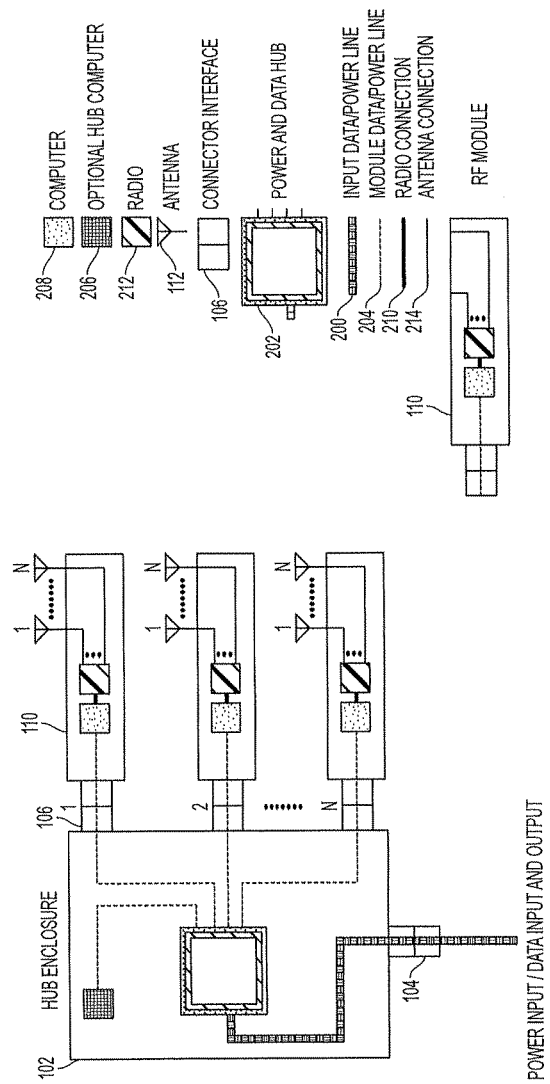
FIG. 2A is a schematic diagram of an exemplary circuit for a configuration of the modular RF hub shown in FIG. 1A that includes shared power and data input and output lines.

FIG. 2A is a schematic diagram of an exemplary circuit for a configuration of the modular RF hub shown in FIG. 1B that includes combined power and data input and output lines. This circuit diagram illustrates one embodiment of the bus located within the RF hub 102 for distributing power and data among the RF modules 110. Referring to FIG. 2A, RF hub 102 includes various circuitry for distributing power and data among the RF modules 110. Specifically, the combined power input and data input/output (I/O) line 200 is received by the shared data and power interface 104 and connected to the power and data hub 202. The power and data hub 202 distributes the combined power input and data I/O 200 into a plurality of individual, per-module, combined power output and data I/Os 204. In one configuration, the RF hub 102 includes an optional hub computer 208, such as a processor and memory, and receives as input one of the combined data and power module outputs 204. The additional combined power output and data I/Os 204 are routed to each of the module interfaces 106 and ultimately to each RF module 110. Once the combined power output and data I/O 204 enters the RF module 110, the power output and data I/O 204 is received by a computer 208. The computer 208 communicates via a radio connection 210 with the radio 212 for powering the computer 208 and for processing the data signal for wireless transmission and reception by the antennas 112, where the radios 212 are connected via one or more antenna connections 214 located on the RF modules 110 to the antennas 112.

Figure 2B:
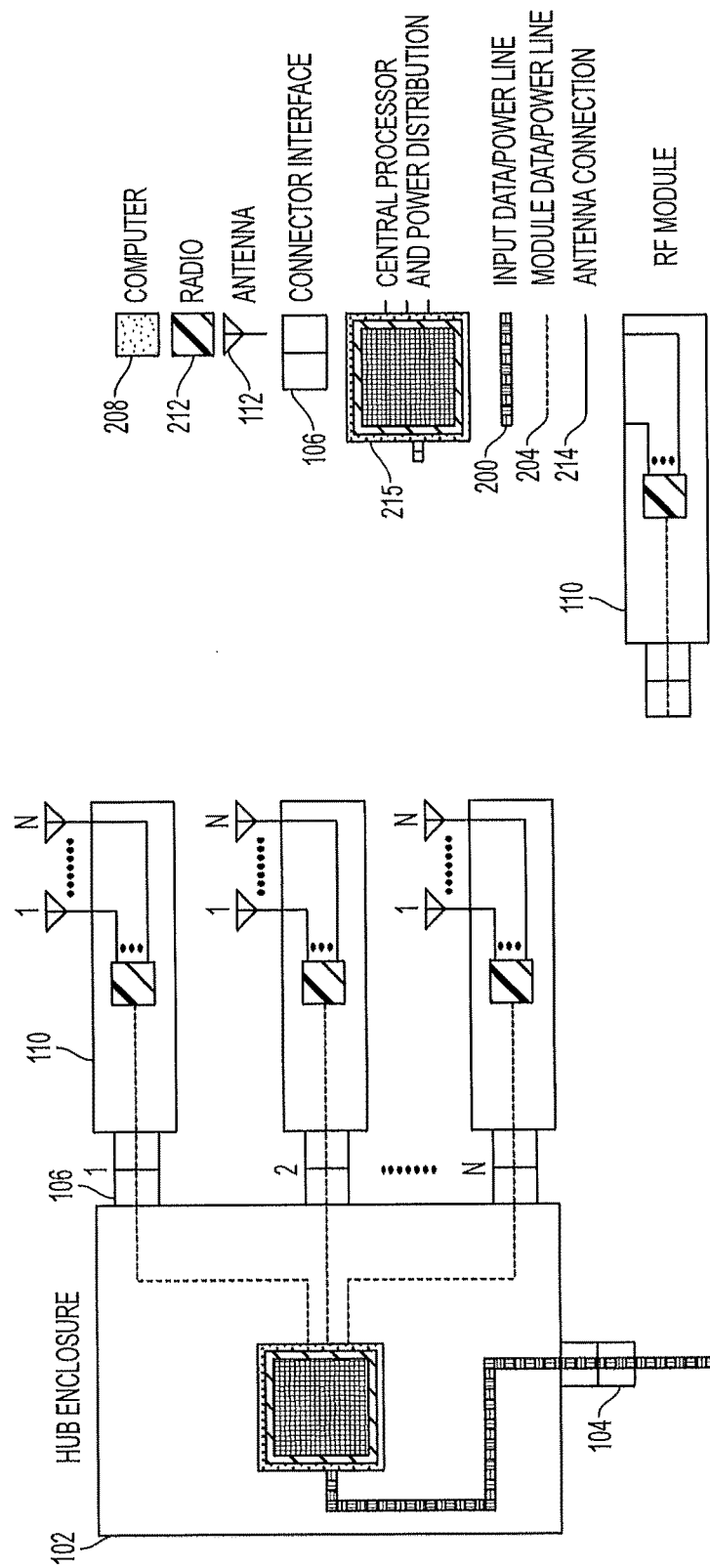
FIG. 2B is a schematic diagram of an exemplary circuit for a configuration of the modular RF hub shown in FIG. 1A that includes shared power and data input and output lines and a central data processing unit.

FIG. 2B is a schematic diagram of an exemplary circuit for a configuration of the modular RF hub shown in FIG. 1B that includes shared power and data input and output lines and a central data processing unit. This circuit diagram illustrates another embodiment of the bus located within the RF hub 102 for distributing power and data among the RF modules 110. In contrast to the combined power and data hub 202 shown in FIG. 2A which does not perform any data processing functions, the configuration shown in FIG. 2B includes a data processor, such as a central processing unit, and power distribution unit 215 for both distributing power to the RF modules 110 and processing the data signal(s). This may allow for implementing additional functionality that may be programmed via software that is executed by the data processor and power distribution unit 215.

Figure 2C:
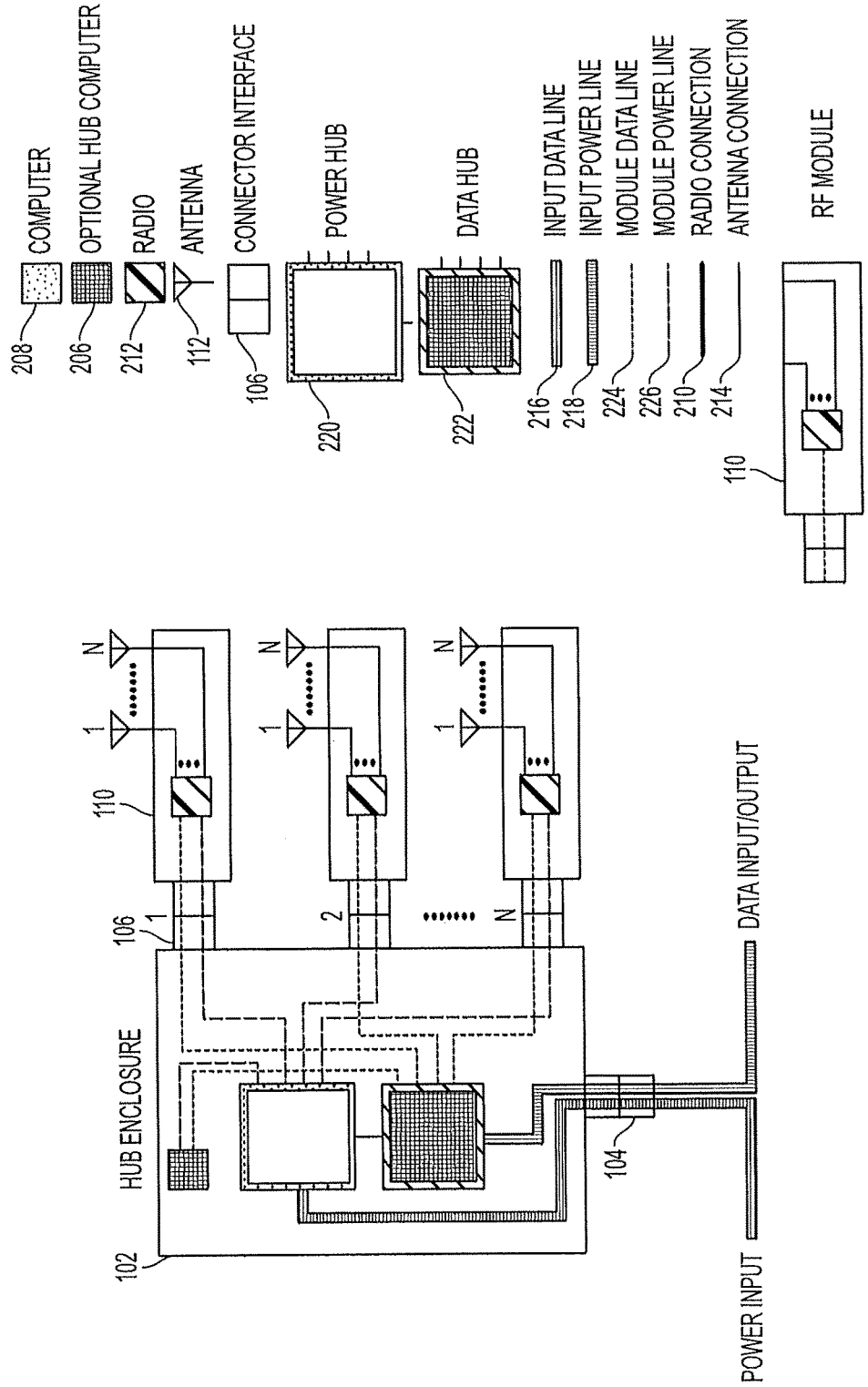
FIG. 2C is a schematic diagram of an exemplary circuit for a configuration of the modular RF hub shown in FIG. 1A that includes separate power and data input and output lines.

FIG. 2C is a schematic diagram of an exemplary circuit for a configuration of the modular RF hub shown in FIG. 1B that includes separate power and data input and output lines. This circuit diagram illustrates yet another embodiment of the bus located within the RF hub 102 for distributing power and data among the RF modules 110. Referring to FIG. 2B, in contrast to the embodiment shown in FIG. 2A, the RF hub 102 includes circuitry for separately distributing power and data among the RF modules 110. Specifically, the data input 216 and the power input 218 are received by the shared data and power interface 104. The data input 216 is routed to a data hub 222 while the power input 218 is routed to a power hub 220. The data hub 222 divides and distributes (e.g., multiplexes and de-multiplexes) the data input 216 to a plurality of data outputs 224. Similarly, the power hub 220 distributes the power input 218 to a plurality of power outputs 226.

In one configuration, the RF hub 102 includes an optional hub computer 206 that receives as input one of the plurality of data outputs 224 and one of the plurality of power outputs 226. The additional data outputs 224 and power outputs 226 are routed to each of the module interfaces 106 and ultimately to each RF module 110. Once the data outputs 224 and the power outputs 226 enter each RF module 110, the data outputs 224 and power outputs 226 are received by a computer 208 located on each RF module 110. The computer 208 then communicates via a radio connection 210 with radios 212 for processing the data signal for wireless transmission and reception by the antennas 112, where the radios 212 are connected via one or more antenna connections 214 located on the RF modules 110 to the antennas 112.

Figure 2D:
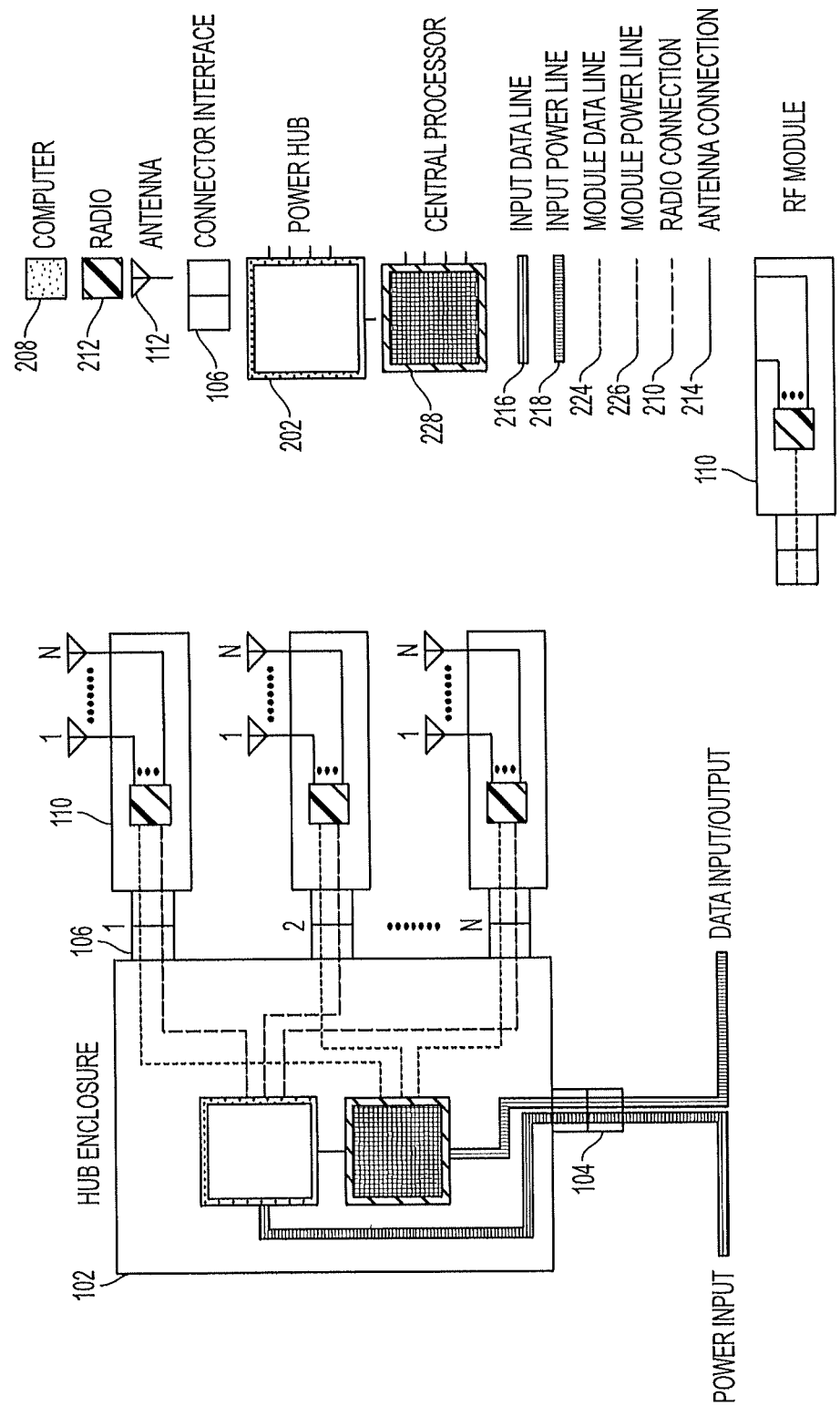
FIG. 2D is a schematic diagram of an exemplary circuit for a configuration of the modular RF hub shown in FIG. 2C that includes separate power and data input and output lines and a central data processing unit.

FIG. 2D is a schematic diagram of an exemplary circuit for a configuration of the modular RF hub shown in FIG. 1B that includes separate power and data input and output lines and a central data processing unit. This circuit diagram illustrates yet another embodiment of the bus located within the RF hub 102 for distributing power and data among the RF modules 110. In contrast to the data hub 222 shown in FIG. 2C, which does not perform any data processing functions, the configuration shown in FIG. 2D includes a central data processor 228 for processing the data signals 216 and 224. This may allow for implementing additional functionality that can be programmed via software which is executed by the central data processor 228.

Figure 3A:
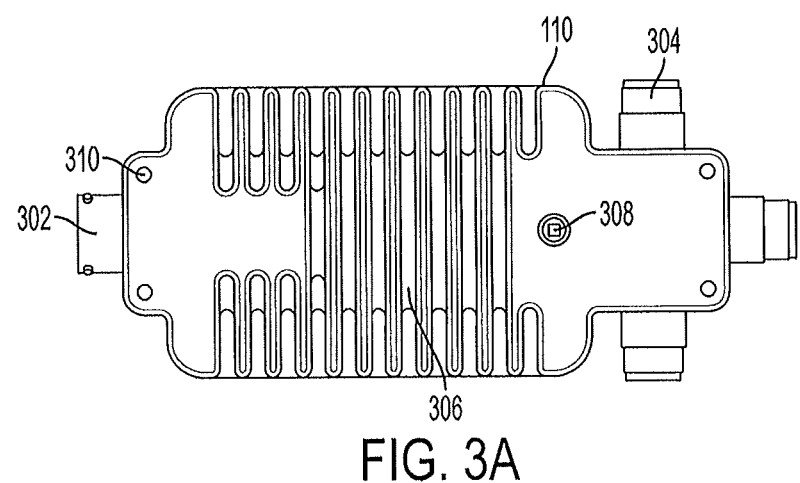
FIG. 3A is a diagram showing a top view of an exemplary sealed RF module according to an embodiment of the subject matter described herein.

FIG. 3A is a diagram showing a top view of an exemplary sealed RF module according to an embodiment of the subject matter described herein. The RF module 300 is now weather-sealed and ready for use. By itself, the RF module 300 can transmit and receive data and, as such, RF module 300 can be a functioning node of a network. RF communication can take place through one or more antenna ports 304 which may be located on the RF module 300. Referring to FIG. 3A, the RF module 300 includes a data and power interface 302 for interfacing with the RE hub 100. One or more antenna connectors 304 are provided for connecting (i.e., attaching and communicating) antennas. Heatsinks 306 may be provided for the RF module 300 to dissipate heat produced by internal electronic components in order to ensure proper operation. A power and status LED indicator 308 may be included on each RF module 300 in order to indicate the power and/or other status of the RF module 300. For example, a solid green light 308 may indicate that the RF module 300 is receiving power and is fully operational, a blinking green light 308 may indicate that the RF module 300 is receiving power but is not operating correctly, and an orange light 308 may indicate that the RF module 300 has completely failed.

Figure 3B:
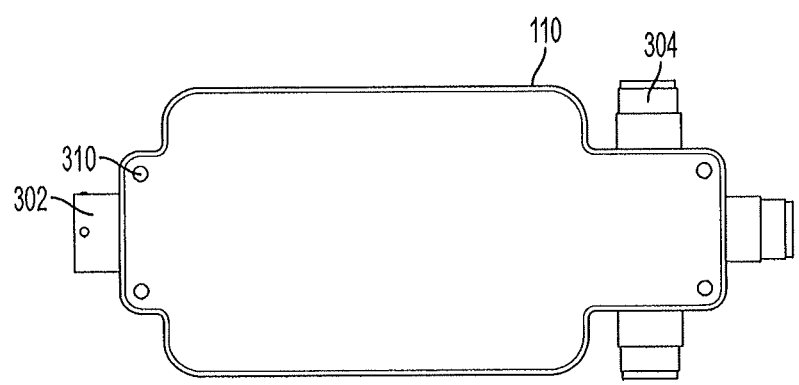
FIG. 3B is a diagram showing a bottom view of an exemplary sealed RF module according to an embodiment of the subject matter described herein.

FIG. 3B is a diagram showing a bottom view of an exemplary sealed RF module according to an embodiment of the subject matter described herein. Referring to FIG. 3B, the RF module 300 includes a data and power interface 302 for interfacing with the RF hub 102 and one or more connectors 304 for connecting to one or more antennas. While the bottom view of the housing portion of the RF module 300 is smooth, it is appreciated that the entire housing portion of the RF module 300 may provide heat dissipation, whether through dedicated heat sink fins 306 or not.

Figure 3C:
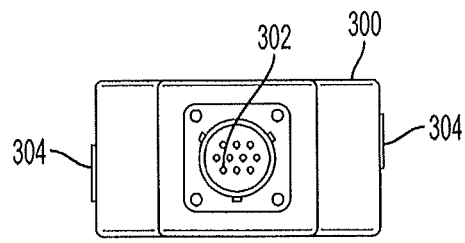
FIG. 3C is a diagram showing a left view of an exemplary sealed RF module according to an embodiment of the subject matter described herein.

FIG. 3C is a diagram showing a left view of an exemplary sealed RF module according to an embodiment of the subject matter described herein. In this view, it can been appreciated that the data and power interface 302 may include one or more conductive pins for transferring data and power between the RF hub 202 and the RF module 300. However, any suitable interface for transferring data and power may be used. While the tips of the antenna ports 304 are viewable in this perspective, it is appreciated that the antenna ports 304 may be of any suitable size or length.

Figure 3D:
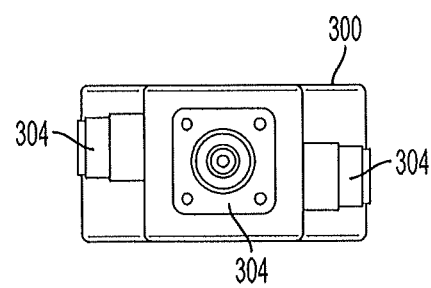
FIG. 3D is a diagram showing a right view of an exemplary sealed RF module according to an embodiment of the subject matter described herein.

FIG. 3D is a diagram showing a right view of an exemplary sealed RF module according to an embodiment of the subject matter described herein. Referring to FIG. 3D, two of the antenna ports 304 are shown in side view and one of the antenna ports 304 is shown head-on. It may be appreciated that in the embodiment shown, two of the antenna ports 304 are staggered relative to the other. This may be necessary in order to physically route any connections from the antenna port 304 inside of the RF module 300.

Figure 3E:
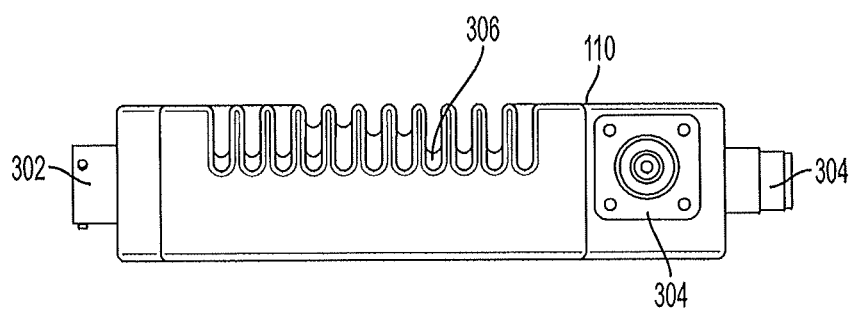
FIG. 3E is a diagram showing a front view of an exemplary sealed RF module according to an embodiment of the subject matter described herein.

FIG. 3E is a diagram showing a front view of an exemplary sealed RF module according to an embodiment of the subject matter described herein. Referring to FIG. 3E, a side view of the data and power interface 302 is shown, a front view of one of the antenna ports 304 is shown, and a side view of another of the antenna ports 304. Additionally, the profile view of the heatsinks 306 show that the heatsinks 306 may having varying fin depths or other configuration depending on the cooling needs of the RF module 300.

Figure 4:
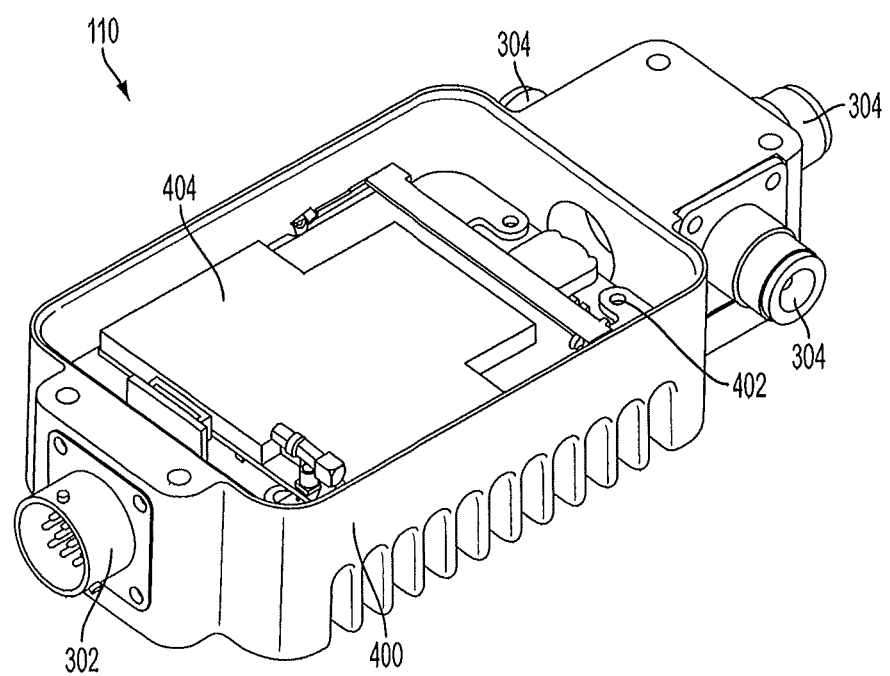
FIG. 4 is a diagram showing a perspective cut-away view of an exemplary sealed RF module according to an embodiment of the subject matter described herein.

FIG. 4 is a diagram showing a perspective cut-away view of an exemplary sealed RF module according to an embodiment of the subject matter described herein. FIG. 4 represents a possible integration of a single board computer with radio, where weatherproof N-connectors are used to interface with antennas while a rugged circular connector is used to connect data and power. As mentioned earlier, the case itself serves as a heat sink for the computer processor and radio card as well. Referring to FIG. 4, the RF module 400 includes a rugged, weatherproof case and thermal dissipater 402 for enclosing the internal components of the RF module 400 and dissipating and heat generated therefrom. At one end of the RF module 400, a weatherproof power and data interface 404 is provided for connecting to the RF hub and, at the opposite end of the RF module 400, one or more antenna connectors 406 are provided for connecting to one or more RF antennas. A single board computer 408, such as the Laguna GW2380 Network Platform produced by Gateworks Corporation of San Luis Obispo, Calif., may be provided for performing processing functions. A radio module 410, such as the Doodle Labs DLM108 operating at 900 MHz, may be provided for performing radio frequency-related processing functions.

Figure 5A:
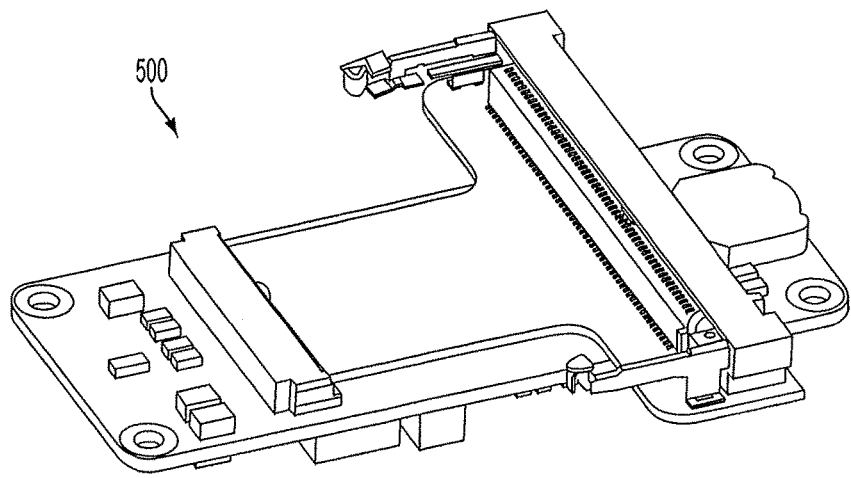
FIG. 5A is a diagram showing a perspective view of an exemplary configuration of internal components of a sealed RF module according to an embodiment of the subject matter described herein.

FIG. 5A is a diagram showing a perspective view of an exemplary configuration of internal components of a sealed RF module according to an embodiment of the subject matter described herein. Referring to FIG. 5A, the single board computer 500 may include a mini-PCI express-to-mini PCI express adapter PCB as shown. Since there are many mini-PCI radios in existence, a custom adapter, such as the one shown in FIG. 5A, greatly increases the number and types of frequencies available.

Figure 5B:
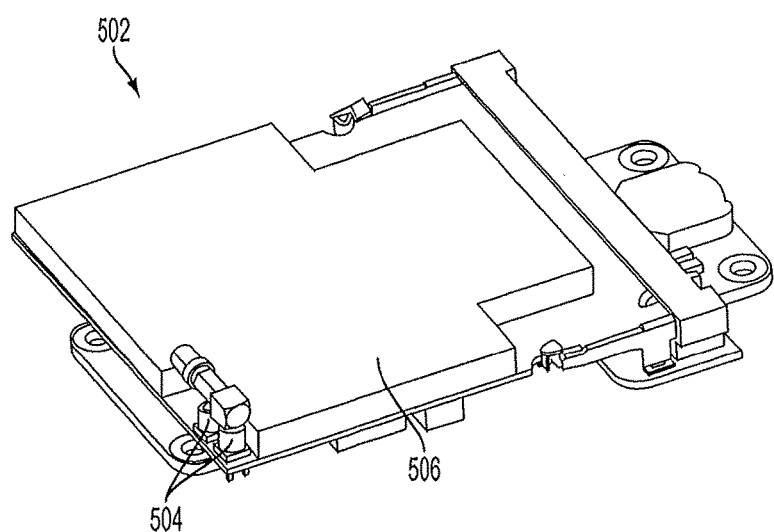
FIG. 5B is a diagram showing a perspective view of an exemplary configuration of internal components of a sealed RF module according to an embodiment of the subject matter described herein.

FIG. 5B is a diagram showing a perspective view of an exemplary configuration of internal components of a sealed RF module according to an embodiment of the subject matter described herein. Referring to FIG. 5B, the radio module 502 may include antenna connections 504 and mini-PCI express radio 506. While FIG. 5B shows a DLM108 from Doodle Labs, other mini-PCI radios may also be used including, but not limited to, the Ubiquiti XR2, XR5, SR4, and XR9 and the Doodle Labs DLM105, DLM108, and DL4900 mini-PCI express radios.

Figure 6:
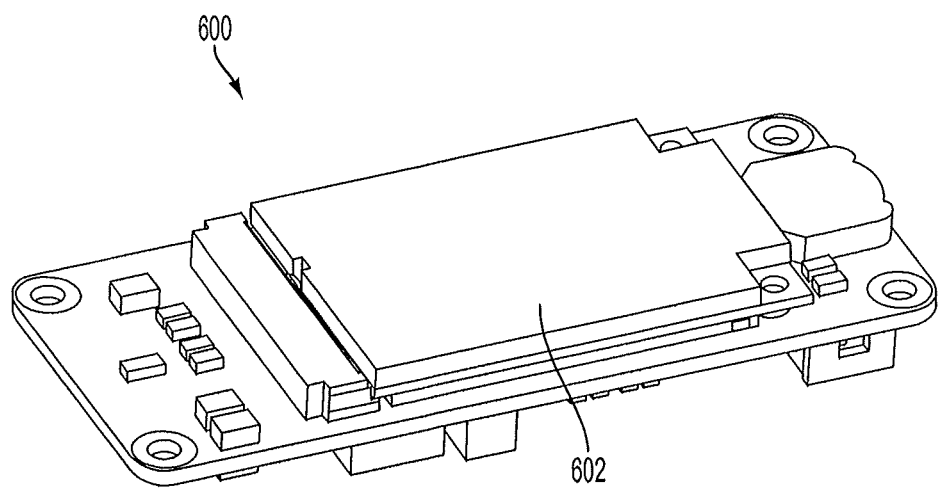
FIG. 6 is a diagram showing a perspective view of an exemplary single board computer with PCI express radio suitable for use in an RF hub according to an embodiment of the subject matter described herein.

FIG. 6 is a diagram showing a perspective view of an exemplary single board computer with PCI express radio suitable for use in an RF hub according to an embodiment of the subject matter described herein. FIG. 6 shows a radio module inserted into the single board computer 600. In the configuration shown, all the electronics of the RF module 400 are in place and only a case and external connections need to be made to achieve complete functionality. The radio 602 in this case may include a Sonnet Aria Extreme N (N80211-EM), JJPLUS NA24ME0, or any mini-PCI express radio.

Figure 7A:
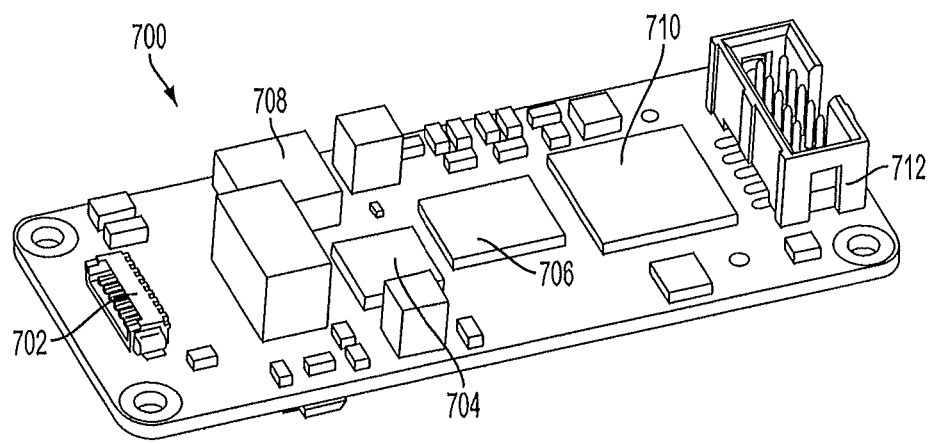
FIG. 7A is a diagram showing a top view of an exemplary single board computer suitable for use in an RF hub according to an embodiment of the subject matter described herein.

FIG. 7A is a diagram showing a top view of an exemplary single board computer suitable for use in an RF hub according to an embodiment of the subject matter described herein. In this embodiment, the computer is a Gateworks GW2380. However, it is appreciated that other processors or memories may also be used. The data connection may be standard gigabit Ethernet interface, a mini-PCI express interface, or any other suitable interface. Referring to FIG. 7A, the single board computer 700 includes an Ethernet connection 702 and an Ethernet driver 704 for communicating Ethernet data between components, a memory 706 for storing computer-executable instructions, a converter 708 which is an electronic circuit that converts a source of direct current (DC) from one voltage level to another voltage level, a processor 710 for executing computer-readable instructions stored in the memory 706, and a general purpose input output (GPIO) 712 that is a generic pin on a chip whose behavior (including whether it is an input or output pin) can be controlled (programmed) through software.

Figure 7B:
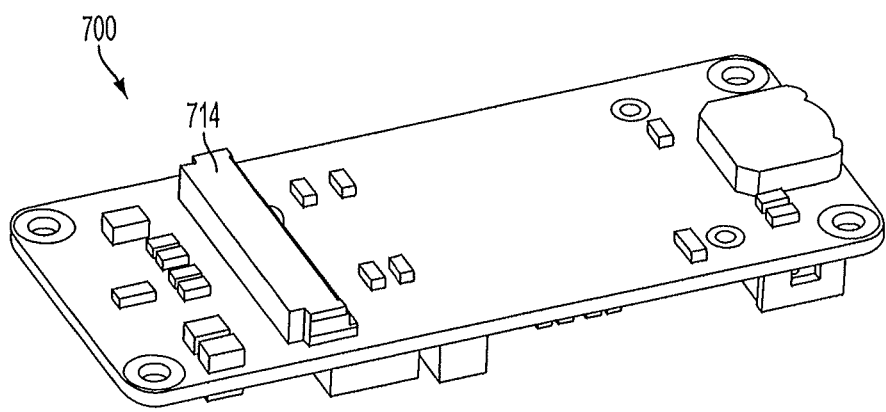
FIG. 7B is a diagram showing a bottom view of an exemplary single board computer suitable for use in an RF hub according to an embodiment of the subject matter described herein.

FIG. 7B is a diagram showing a bottom view of the exemplary single board computer in 7A according to an embodiment of the subject matter described herein. Referring to FIG. 7B, the single board computer 700 includes a PCI express interface 714 for communicating data between components.

Figure 8:
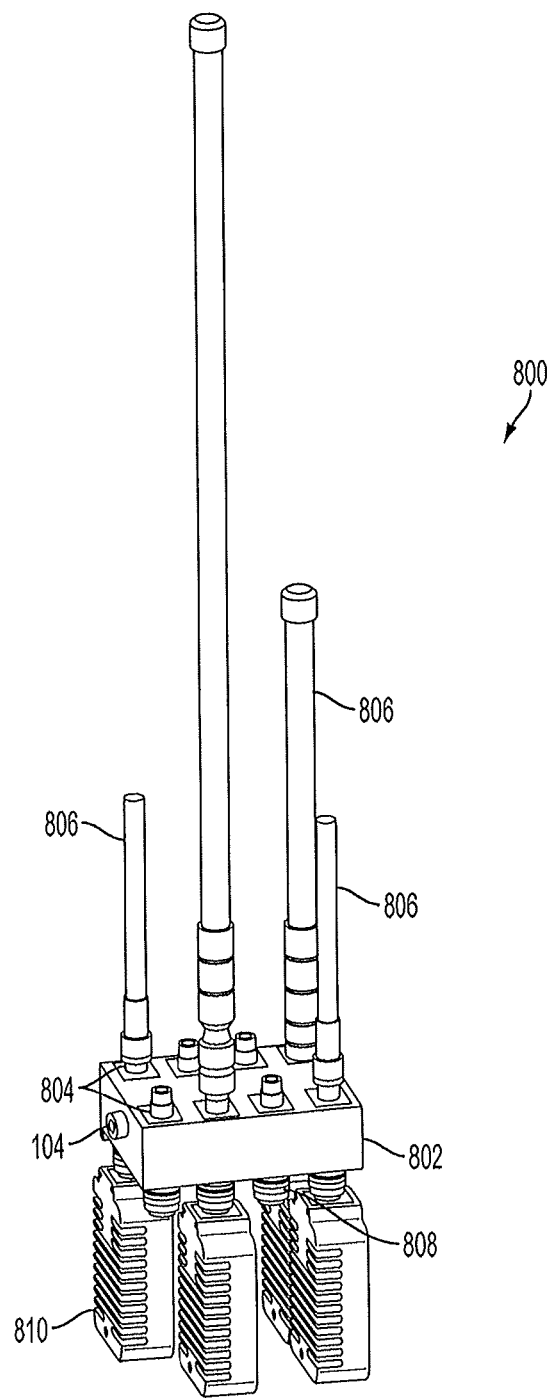
FIG. 8 is a diagram showing a perspective view of an alternate configuration of an exemplary RF hub with antennas according to an embodiment of the subject matter described herein.

FIG. 8 is a diagram showing a perspective view of an alternate configuration of an exemplary RF hub with antennas according to an embodiment of the subject matter described herein. In contrast to the embodiments described above where each of the RF modules includes one or more antenna interfaces and are connected to the outside of the RF hub, the embodiment shown in FIG. 8 includes an RF hub having a plurality of RF modules without antennas connected to the bottom side of the RF hub and a plurality of antennas connected to the top side of the RF hub. Though the RF modules may contain a radio, each RF module does not require an onboard antenna interface, which is separate from the data and power interface which connects to the RF hub. In one scenario, a special conductor for passing the radio output may also be used.

Referring to FIG. 8, the modular RF communications assembly 800 includes an RF hub 802 having a plurality of antenna ports 804 located on one side of the RF hub 802 for connecting to a plurality of antennas 806 and a corresponding plurality of communications interfaces 808 located on the opposite side of the RF hub 802 for connecting to a plurality of RF modules 810. In the embodiment shown, eight antenna ports 804 are shown in an equally-spaced rectangular grid pattern. However, it is appreciated that any number of antenna ports 804 or patterns may be used. On the opposite side of the RF hub 802 are a plurality of modular communications interfaces 808 for connecting RF modules 810 to the RF hub 802. In contrast to the RF modules 110 described above which include the antenna ports 804 on each of the RF modules 110, the RF modules 810 shown in FIG. 8 do not include any antenna ports 804 because the antenna ports 804 are located directly on the RF hub 802. This configuration allows for more a compact modular RF communications assembly 800 or for mounting onto utility poles where separating the antennas 806 from the RF modules 810 may be desirable. Finally, the RF hub 802 includes a shared data and power interface 812 for connecting to the network in a similar manner as described above.

Figure 9A:
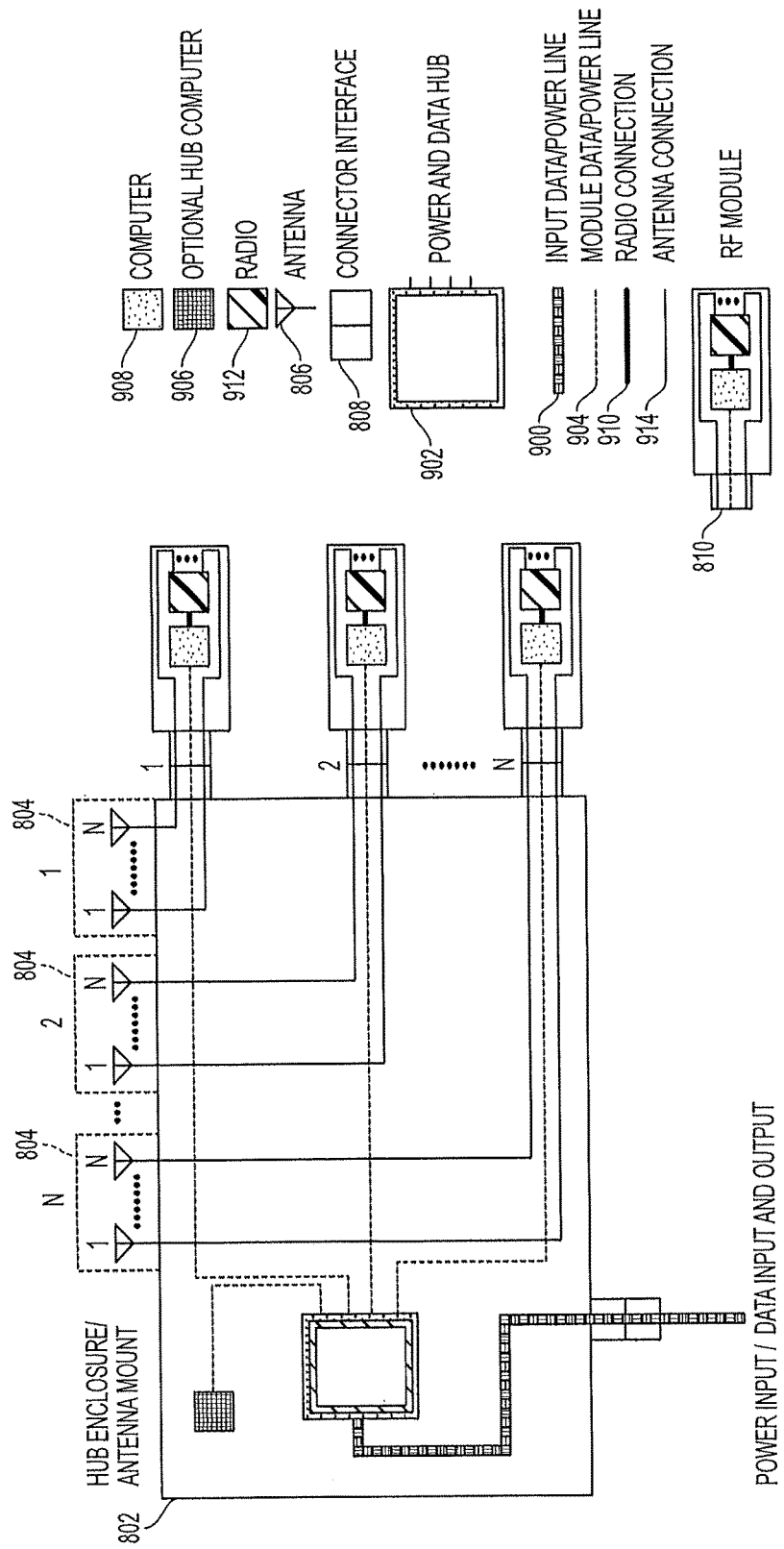
FIG. 9A is a schematic diagram of an exemplary circuit for a configuration of the modular RF hub shown in FIG. 8 that includes shared power and data input and output lines.

FIG. 9A is a schematic diagram of an exemplary circuit for a configuration of the modular RF hub shown in FIG. 8 that includes shared power and data input and output lines. Referring to FIG. 9A, the RF hub 802 includes various circuitry for distributing power and data among the RF modules 810. Similar to FIGS. 2A-2D described above, this circuit diagram illustrates one embodiment of the bus located within the RF hub 802 for distributing power and data among the RF modules 810. Specifically, the combined power input and data input/output (I/O) line 900 is received by the shared data and power interface and is connected to the power and data hub 902. The power and data hub 902 distributes the combined power input and data I/O 900 into a plurality of individual combined power output and data I/Os 904. In one configuration, the modular RF hub 802 includes an optional hub computer 906 and receives as input one of the combined data and power module outputs 904. The additional combined power output and data I/Os 904 are routed to each of the module connector interfaces 808 and ultimately to each RF module 810. Once the combined power output and data I/O 904 enters the RF module 810, the power output and data I/O 904 is received by a computer 908. The computer 908 communicates via a radio connection 910 with the radio 912 for processing the data signal for wireless transmission and reception by the antennas 806. In contrast to the embodiment shown in FIGS. 1A, 1B, 2A, and 2B where the antennas are located on each of the RF modules, in the present embodiment, the antennas 806 are connected directly to the RF hub 802 via the antenna interfaces 804. As such, the antenna connections 914 from the radios 912 are routed from the radios 912 on the RF modules 810 to the antennas 806 via a path back through the module interfaces 808 and through the RF hub 802 to the antenna interfaces 804.

Figure 9B:
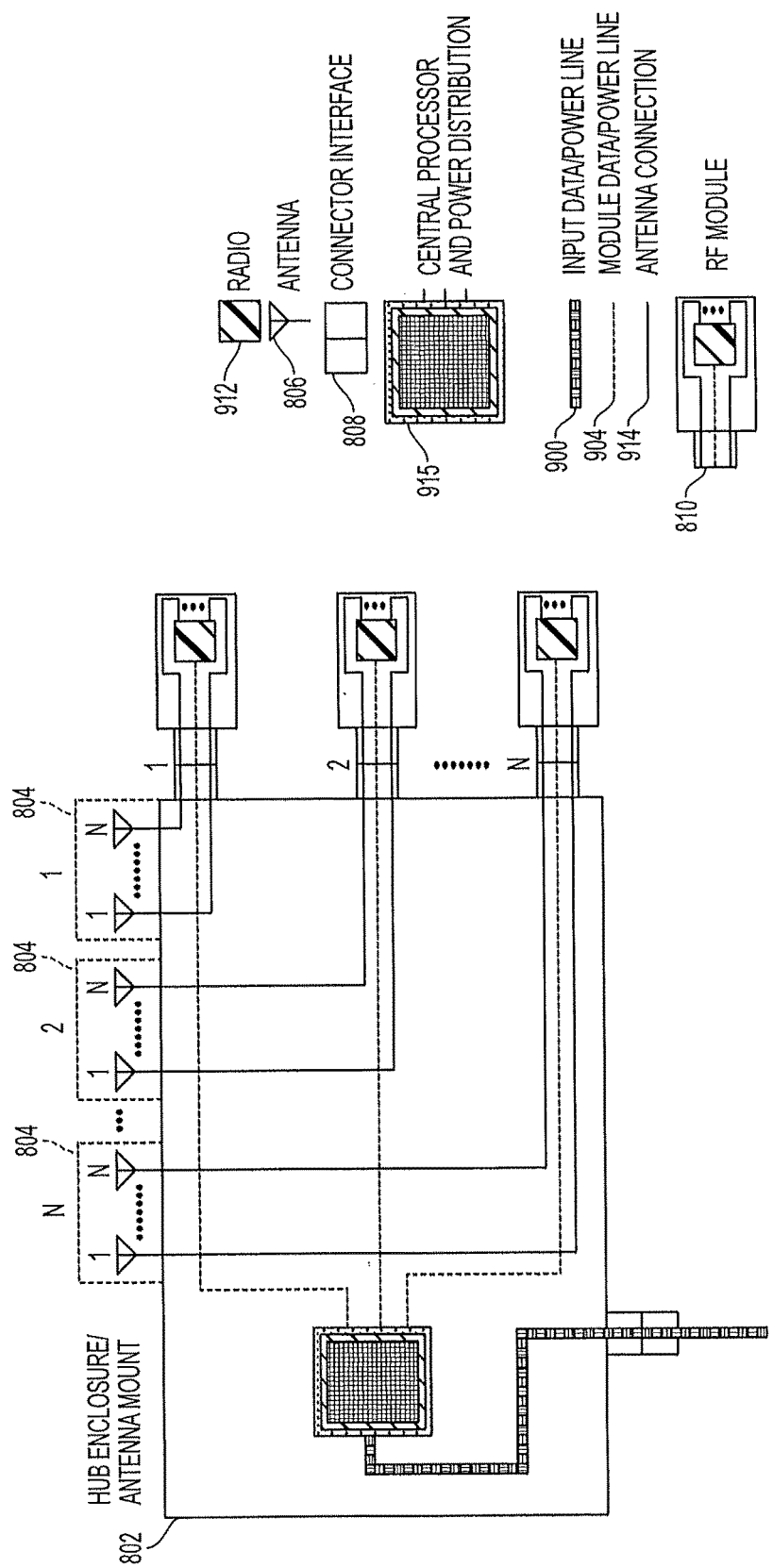
FIG. 9B is a schematic diagram of an exemplary circuit for a configuration of the modular RF hub shown in FIG. 8 that includes shared power and data input and output lines and a central data processing unit.

FIG. 9B is a schematic diagram of an exemplary circuit for a configuration of the modular RF hub shown in FIG. 8 that includes shared power and data input and output lines and a central data processing unit. This circuit diagram illustrates another embodiment of the bus located within the RF hub 802 for distributing power and data among the RF modules 810. In contrast to the combined power and data hub 802 shown in FIG. 9A, which does not perform any data processing functions, the configuration shown in FIG. 9B includes a data processor, such as a central processing unit, and power distribution unit 915 for both distributing power to the RF modules 810 and processing the data signal(s) 900 and 904. This may allow for implementing additional functionality that may be programmed via software that is executed by the data processor and power distribution unit 915.

Figure 9C:
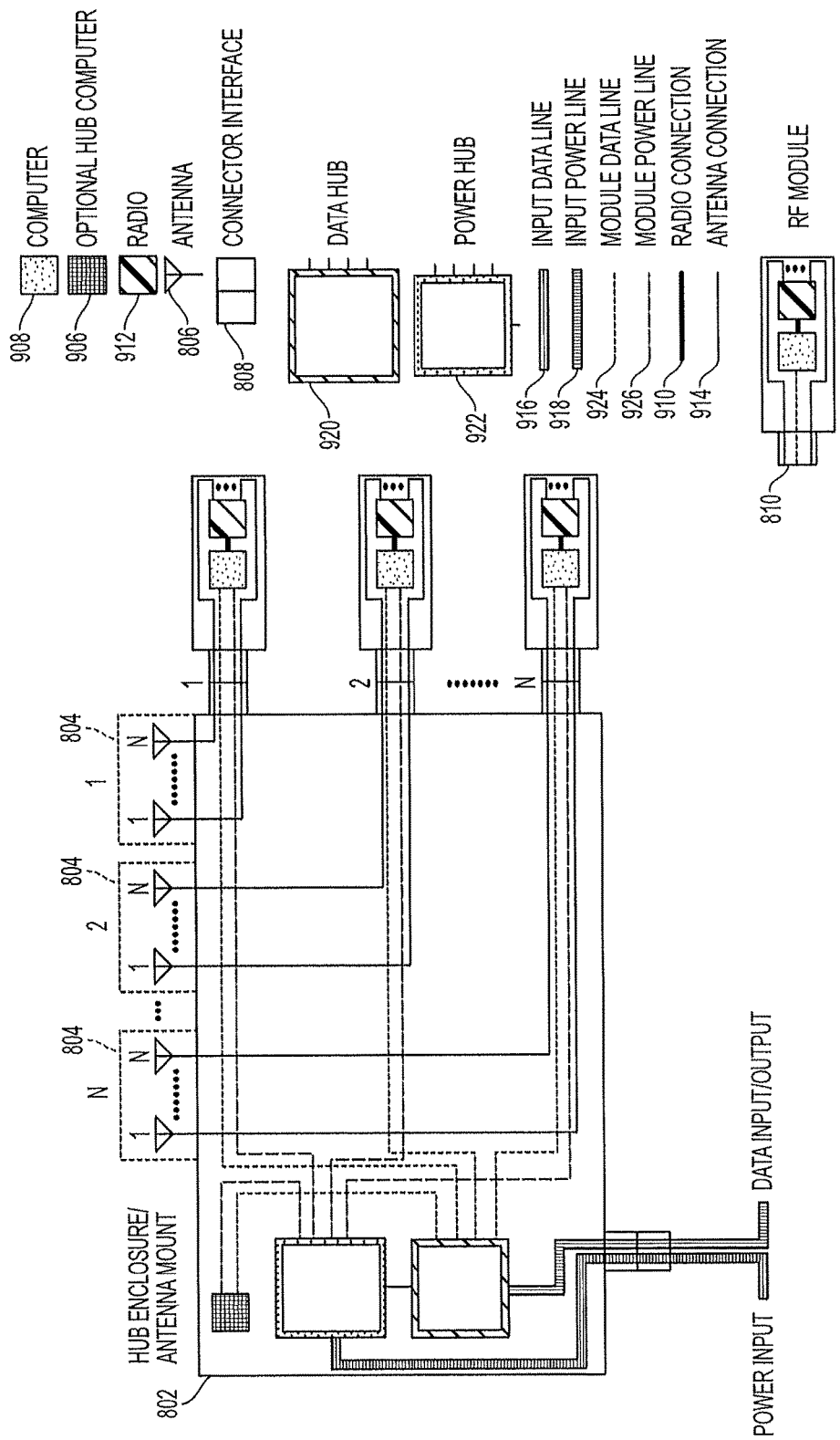
FIG. 9C is a schematic diagram of an exemplary circuit for a configuration of the modular RF hub shown in FIG. 8 that includes separate power and data input and output lines.

FIG. 9C is a schematic diagram of an exemplary circuit for a configuration of the modular RF hub shown in FIG. 8 that includes separate power and data input and output lines. This circuit diagram illustrates yet another embodiment of the bus located within the RF hub 802 for distributing power and data among the RF modules 810. Referring to FIG. 9C, in contrast to the embodiment shown in FIG. 9A, the RF hub 802 includes circuitry for separately distributing power and data among the RF modules 810. Specifically, the data I/O 916 and the power input 918 are received by the shared data and power interface. The data I/O 916 is routed to a data hub 920 while the power input 918 is routed to a power hub 922. The data hub 920 divides and distributes (e.g., multiplexes and de-multiplexes) the data input 916 to a plurality of data outputs 924. Similarly, the power hub 222 distributes the power input 918 to a plurality of power outputs 926.

In one configuration, the RF hub 802 includes an optional hub computer 908 that receives as input one of the plurality of data outputs 924 and one of the plurality of power outputs 926. The additional data outputs 924 and power outputs 926 are routed to each of the module connector interfaces 808 and ultimately to each RF module 810. Once the data outputs 924 and the power outputs 926 enter each RF module 810, the data outputs 924 and power outputs 926 are received by a computer 908 located on each RF module 810. As mentioned above, in contrast to the embodiment shown in FIGS. 1A, 1B, 2A, and 2B where the antennas are located on each of the RF modules, in the present embodiment, the antennas 806 are connected directly to the RF hub 802 via the antenna interfaces 804. As such, the antenna connections 914 from the radios 912 are routed from the radios 912 on the RF modules 810 to the antennas 806 via a path back through the module interfaces 808 and through the RF hub 802 to the antenna interfaces 804.

Figure 9D:
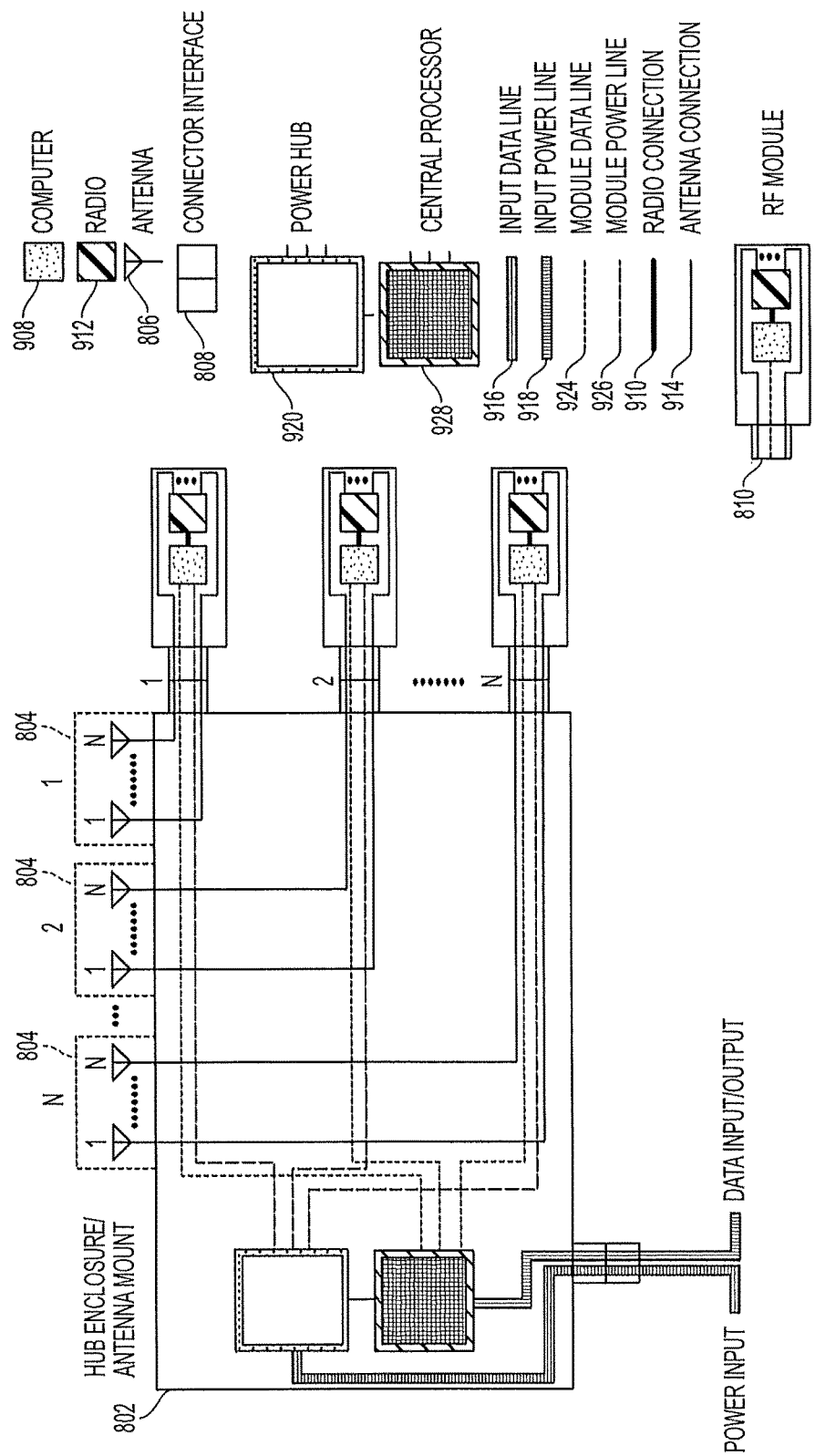
FIG. 9D is a schematic diagram of an exemplary circuit for a configuration of the modular RF hub shown in FIG. 8 that includes separate power and data input and output lines and a central data processing unit.

FIG. 9D is a schematic diagram of an exemplary circuit for a configuration of the modular RF hub shown in FIG. 8 that includes separate power and data input and output lines and a central data processing unit. This circuit diagram illustrates yet another embodiment of the bus located within the RF hub 802 for distributing power and data among the RF modules 810. In contrast to the data hub 920 shown in FIG. 9C, which does not perform any data processing functions, the configuration shown in FIG. 9D includes a central data processor 928 for processing the data signals 916 and 924. This may allow for implementing additional functionality that can be programmed via software which is executed by the central data processor 928.

Figure 10:
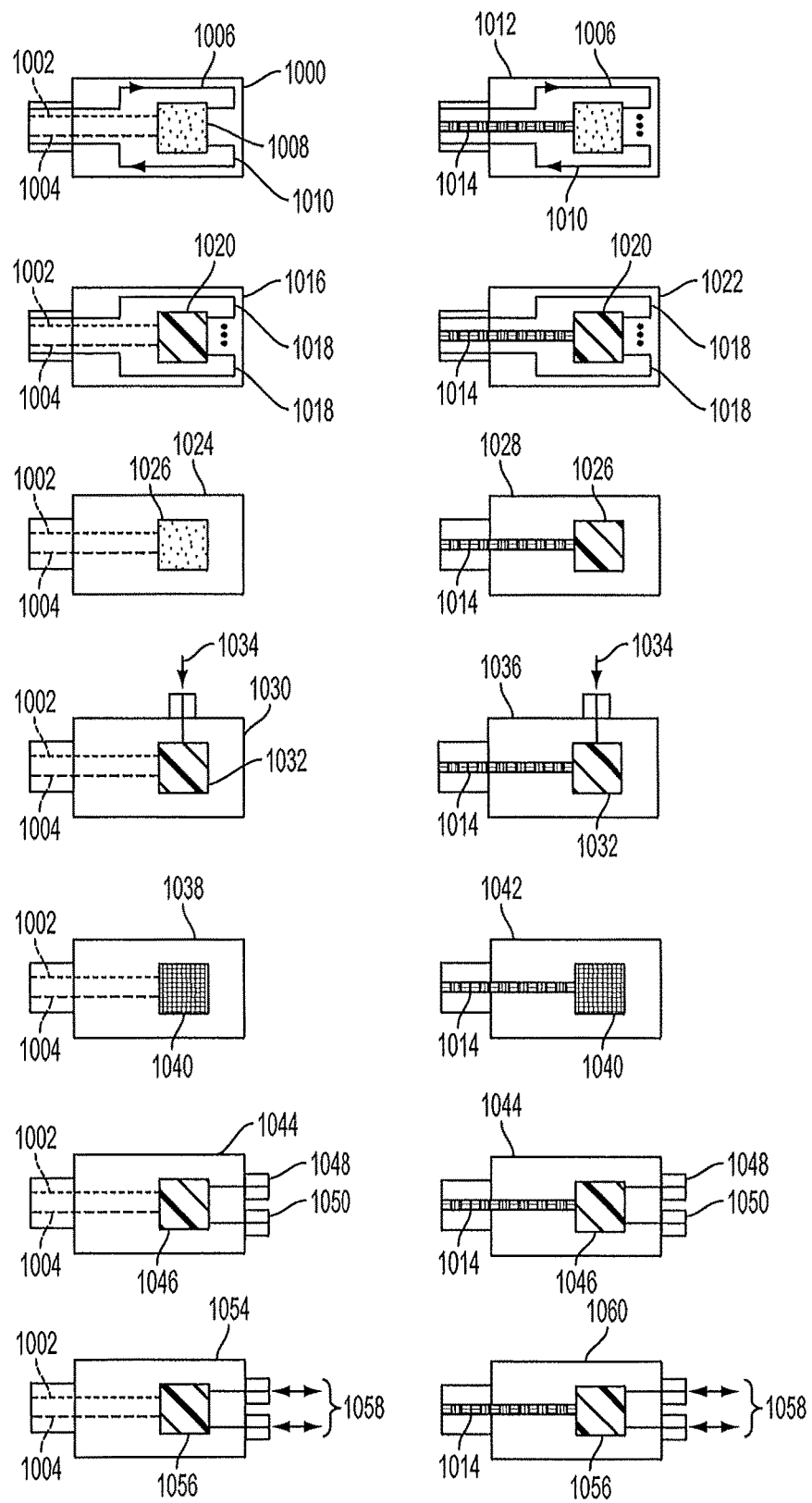
FIG. 10 is a diagram illustrating various configurations of exemplary RF modules suitable for use with an RF hub according to an embodiment of the subject matter described herein.

FIG. 10 is a diagram illustrating various exemplary configurations of RF modules for use with an RF hub according to an embodiment of the subject matter described herein. Referring to FIG. 10, amplifier module 1000 includes a separate data line 1002 and a power line 1004. An RF line (or lines) 1006 may be connected from another RF module, amplified by an amplifier 1008, and sent out via connection 1010. The data line 1002 may control power output and perform diagnostics. The amplifier module 1012 may include a combined data and power line 1014 connected to the amplifier 1008 for receiving the input RF line 1006, amplifying it, and sending it out via connection 1010.

Crypto module 1016 operates like a standard RF module with the addition of special cryptographic software and/or hardware. It is appreciated that the crypto module 1016 may be constructed without any RF components and, in such a configuration, the crypto module 1016 may accept data from other modules and return encrypted data. For example, the crypto module 1016 may receive data via connections 1018 and perform data encryption functions using the cryptographic software and/or hardware module 1020. Similarly, the crypto module 1022 may accept data from other modules and return the encrypted data, but includes a combined power and data line 1014 rather than separate data and power lines 1002 and 1004.

Battery module 1024 includes a battery 1026 for storing energy supplied by the power line 1004. The battery module 1024 can charge the internal battery 1026 and supply power over the same line 1004 when the battery module 1024 detects a zero input voltage. The data line 1002 can be configured to transmit the battery power level for monitoring or diagnostics. Likewise, the battery module 1028 stores and supplies power using its internal battery 1026 via the combined power and data line 1014.

Alternative power module 1030 includes a module having power conditioning and, optionally, a small battery which may accept power input from various alternative energy sources such as a solar cell, a wind turbine, an AC power line, etc. The alternative power module 1030 may be specifically tuned to receive a specific type or range of input power in order to achieve greater efficiency. For example, the alternative power module 1030 may include a small battery 1032 for receiving conditioned power from alternative energy sources via connection 1034. Likewise, the alternative power module 1036 receives energy from alternative energy sources, but is connected to the RF hub via a combined power and data line 1014 rather than separate data and power lines 1002 and 1004.

Processor module 1038 contains a processor 1040, such as a digital signal processor (DSP), which performs functions that are too complex or processing intensive for a standard RF module processor. These functions may include functions such as measuring, filtering, and/or compressing continuous real-world analog signals. Similarly, the processor module 1042 provides additional processing power above a standard RF module, but includes a combined power and data line 1014 rather than separate data and power lines 1002 and 1004.

Media module 1044 is a module used in conjunction with an input device such as a camera and/or microphone to send video and/or audio output onto a communications network as packets. In one embodiment, transducers may be incorporated into the media module 1044 for performing this task. For example, the media module 1044 includes a processor 1046 that is connected to one or more sensors for receiving video input from a camera 1048 and audio input from a microphone 1050 and packetizing it for transmission on the network. Likewise, the media module 1052 performs similar functions to the media module 1044, but includes a combined power and data line 1014 rather than separate data and power lines 1002 and 1004.

Sensor module 1054 is a general purpose module that has a plurality of I/O connections to a variety of sensor types in order to monitor conditions local to the RF hub, such as temperature, moisture, pressure, etc. This information may be used to control a device such as a motor, light, alarm, etc. For example, the sensor module 1054 includes a processor 1056 that is connected to a variety of sensors 1058 for receiving sensor inputs. Likewise, the sensor module 1060 includes a variety of non-media sensors for monitoring local environmental conditions, but includes a combined power and data line 1014 rather than separate data and power lines 1002 and 1004. Additional modules such as a fiber optic interface module for interfacing with a fiber optic communications link, a satellite link Module for interfacing with an antenna which allows satellite communication, and a cellular communication module that can connect to any type of cellular phone network may also be used without departing from the scope of the subject matter described herein.

While particular embodiments have been chosen to illustrate the invention, it will be understood by those skilled in the art that various changes and modifications can be made therein without departing from the scope of the invention as defined in the appended claims.

What is claimed is:

1. A modular radio frequency (RF) hub for transmitting information using a wireless communication standard, the RF hub comprising:
    two or more communications interfaces for detachably and interchangeably connecting to a first RF module and a second RF module, wherein each of the communications interfaces have the same physical and electrical configuration;
    a shared data and power interface for receiving data and power; and
    a bus for distributing the data and power to the two or more communications interfaces, wherein:
    the first RF module transmits information over a first radio frequency band using the wireless communication standard,
    the second RF module transmits information over a second radio frequency band using the wireless communication standard that is different than the first radio frequency band, and
    the two or more communications interfaces are further configured for detachably and interchangeably connecting to a third RF module that encrypts the data.

2. The RF hub of claim 1 wherein at least a first subset of the two or more communications interfaces are located opposite at least a second subset of the two or more communications interfaces.

3. The RF hub of claim 1 further comprising one or more mounting holes for attaching the RF hub to a surface.

4. The RF hub of claim 1 further comprising one or more antenna interfaces for connecting to a radio frequency antenna.

5. The RF hub of claim 4 wherein the one or more antenna interfaces are located separate from the two or more communications interfaces.

6. The RF hub of claim 1 wherein the third RF module transmits the encrypted data over the first radio frequency band or the second radio frequency band.

7. The RF hub of claim 1 wherein the third RF module receives the data from the first RF module, encrypts the data, and returns the encrypted data to the first RF module.

8. A modular radio frequency (RF) communications assembly for transmitting information using a wireless communication standard, comprising:
    a first RF module that transmits information over a first radio frequency band using the wireless communication standard;
    a second RF module that transmits information over a second radio frequency band using the wireless communication standard, wherein the second radio frequency band is different than the first radio frequency band;
    an RF hub comprising:
        two or more communications interfaces for connecting to RF modules, wherein each of the communications interfaces have the same physical and electrical configuration;
        a shared data and power interface for receiving data and power; and
        a bus for distributing the data and power to the two or more communications interfaces;
    a first RF module that transmits information over a first radio frequency band using the wireless communication standard;
    a second RF module that transmits information over a second radio frequency band using the wireless communication standard that is different than the first radio frequency band;
    a third RF module that encrypts the data; and
    one or more antenna interfaces, each configured to connect to a radio frequency antenna.

9. The RF communications assembly of claim 8 wherein at least one of the one or more antenna interfaces is located on the RF hub.

10. The RF communications assembly of claim 8 wherein at least one of the one or more antenna interfaces is located on either the first RF module or the second RF module.

11. The RF communications assembly of claim 8 wherein the third RF module transmits the encrypted data over the first radio frequency band or the second radio frequency band.

12. The RF communications assembly of claim 8 wherein the third RF module receives the data from the first RF module, encrypts the data, and returns the encrypted data to the first RF module.

* * * * *